US008526562B2

(12) United States Patent
Isono et al.

(10) Patent No.: US 8,526,562 B2
(45) Date of Patent: Sep. 3, 2013

(54) REACTOR POWER CONTROL APPARATUS OF NATURAL CIRCULATION REACTOR, GENERATION SYSTEM OF NATURAL CIRCULATION REACTOR AND METHOD FOR CONTROLLING REACTOR POWER OF NATURAL CIRCULATION REACTOR

(75) Inventors: Kimiko Isono, Hitachi (JP); Shin Hasegawa, Mito (JP)

(73) Assignee: Hitachi-GE Nuclear Energy, Ltd., Ibaraki-ken (JP)

( * ) Notice: Subject to any disclaimer, the term of this patent is extended or adjusted under 35 U.S.C. 154(b) by 0 days.

(21) Appl. No.: 11/678,714

(22) Filed: Feb. 26, 2007

(65) Prior Publication Data

US 2007/0201602 A1 Aug. 30, 2007

(30) Foreign Application Priority Data

Feb. 27, 2006 (JP) .................................. 2006-050916

(51) Int. Cl.
*G21C 7/32* (2006.01)
(52) U.S. Cl.
USPC ............................ 376/210; 376/214; 376/217
(58) Field of Classification Search
USPC .......................................... 376/214, 215, 217
See application file for complete search history.

(56) References Cited

U.S. PATENT DOCUMENTS

| | | | | |
|---|---|---|---|---|
| 3,782,113 A * | 1/1974 | Luongo | ............................ | 60/689 |
| 3,931,500 A * | 1/1976 | Berkebile et al. | ............. | 376/217 |
| 4,879,087 A * | 11/1989 | Akiyama et al. | ............... | 376/216 |
| 5,268,939 A * | 12/1993 | Tang et al. | ..................... | 376/210 |
| 5,271,044 A * | 12/1993 | Hidaka et al. | .................. | 376/214 |
| 6,742,336 B2 * | 6/2004 | Itou et al. | ......................... | 60/646 |
| 2002/0015462 A1 * | 2/2002 | Hiraiwa | ........................ | 376/278 |

FOREIGN PATENT DOCUMENTS

| JP | 57-48696 | 3/1982 |
|---|---|---|
| JP | 63-279199 | 11/1988 |
| JP | 2521256 | 5/1996 |

* cited by examiner

*Primary Examiner* — Timothy A Brainard
(74) *Attorney, Agent, or Firm* — Antonelli, Terry, Stout & Kraus, LLP.

(57) ABSTRACT

In the present invention, a reactor power control apparatus of a natural circulation reactor comprises a power control apparatus for controlling reactor power and a pressure control apparatus for controlling reactor pressure. A power adjustment demand signal S4 is input from the power control apparatus into the pressure control apparatus. The pressure control apparatus controls degree of opening of a inlet port steam control valve provided in a moisture separation heater that is connected to a low-pressure turbine, based on the power adjustment demand signal S4.

A reactor power control apparatus of the natural circulation reactor can suppress reactor power variation and obtain stable power.

20 Claims, 7 Drawing Sheets

REACTOR POWER CONTROL APPARATUS OF NATURAL CIRCULATION REACTOR, GENERATION SYSTEM OF NATURAL CIRCULATION REACTOR AND METHOD FOR CONTROLLING REACTOR POWER OF NATURAL CIRCULATION REACTOR

CLAIM OF PRIORITY

The present application claims priority from Japanese application serial no. 2006-050916, filed on Feb. 27, 2006, the content of which is hereby incorporated by reference into this application.

BACKGROUND OF THE INVENTION

The present invention relates to a reactor power control apparatus, and more particularly to a reactor power control apparatus of a natural circulation reactor in which coolant is circulated by natural circulation. In addition, the present invention relates to a natural circulation reactor generation system of which includes the reactor power control apparatus. The present invention relates further to a method for controlling reactor power of a natural circulation reactor.

Generally, reactors are largely divided into a forced circulation type and a natural circulation type based on a circulation system of the coolant (cooling water). The forced circulation reactor includes a recirculation pump such as a jet pump or an internal pump or the like. This pump supplies forcibly cooling water into the core.

Meanwhile, the natural circulation reactor does not include a recirculation pump as in the case of the forced circulation reactor. The cooling water is circulated by the natural circulation force which is based on the difference in density of the cooling water outside of a core shroud which surrounds a core and two-phase flow including steam and cooling water inside the reactor shroud.

In this manner, because the natural circulation reactor does not include a recirculation pump, when load variation of the reactor is demanded, it necessary to be changed the reactor power by operation of a control rod. However, in the case where control rod operation is used, there is a problem in that because the time constant is large from the operation of the control rod to when power of a generator or the like is changed, the following for the load variation becomes bad.

A natural circulation reactor in which thermal power of the reactor is changed without control rod operation is known (see Japanese Patent No. 2521256). Reactor power is changed by using a turbine steam (main steam) control valve and a turbine bypass valve in tandem to control thermal power from the reactor (see Japanese Patent No. 2521256).

SUMMARY OF THE INVENTION

The natural circulation reactor disclosed in Japanese Patent No. 2521256 achieves the decrease of the generator power, in other words, the decrease of the reactor power by opening the turbine bypass valve and introducing steam to a condenser. Also, the increase of the generator power, that is, the increase of the reactor power is achieved by increasing reactor pressure and collapsing void in the cooling water due to close of the turbine steam control valve.

However, in the case where the turbine steam control valve is closed and the reactor pressure is increased, because the flow rate of steam being supplied to the turbine is reduced, there is a problem in that the generator power is decreased and the reactor power is changed.

The object of the present invention provides a reactor power control apparatus of a natural circulation reactor which can suppress generator power variation and supply stable electrical power and also suppress variation in the reactor power.

In order to accomplish the object of the present invention described above, the present invention is a reactor power control apparatus of a natural circulation reactor comprising: a reactor power control section for controlling reactor power; and a pressure control section for controlling reactor pressure, wherein the degree of the opening of a inlet port steam control valve provided with a moisture separation heater is controlled based on a power adjustment demand signal being input from the power control section into the pressure control section.

As a result, when load change is demanded for the reactor, by controlling the opening and closing of the inlet port steam control valve, the flow rate of steam passing the inlet port steam control valve is adjusted and variation in the reactor power is suppressed.

According to the power control apparatus of a natural circulation reactor of the present invention, stable reactor power can be obtained without great variation in reactor power. In addition, following of load variation is improved.

According to the generation system of the natural circulation reactor of the present invention, stable generator power can be obtained without great variation in reactor power.

Furthermore, according to the power control method for the natural-circulation reactor of the present invention, stable reactor power can be obtained without great variation in reactor power.

DESCRIPTION OF THE PREFERRED EMBODIMENT

Preferred embodiments of a reactor power control apparatus of a natural circulation reactor according to the present invention will be described with reference to the drawings, but the present invention is not to be limited by the following examples.

Figure 1:
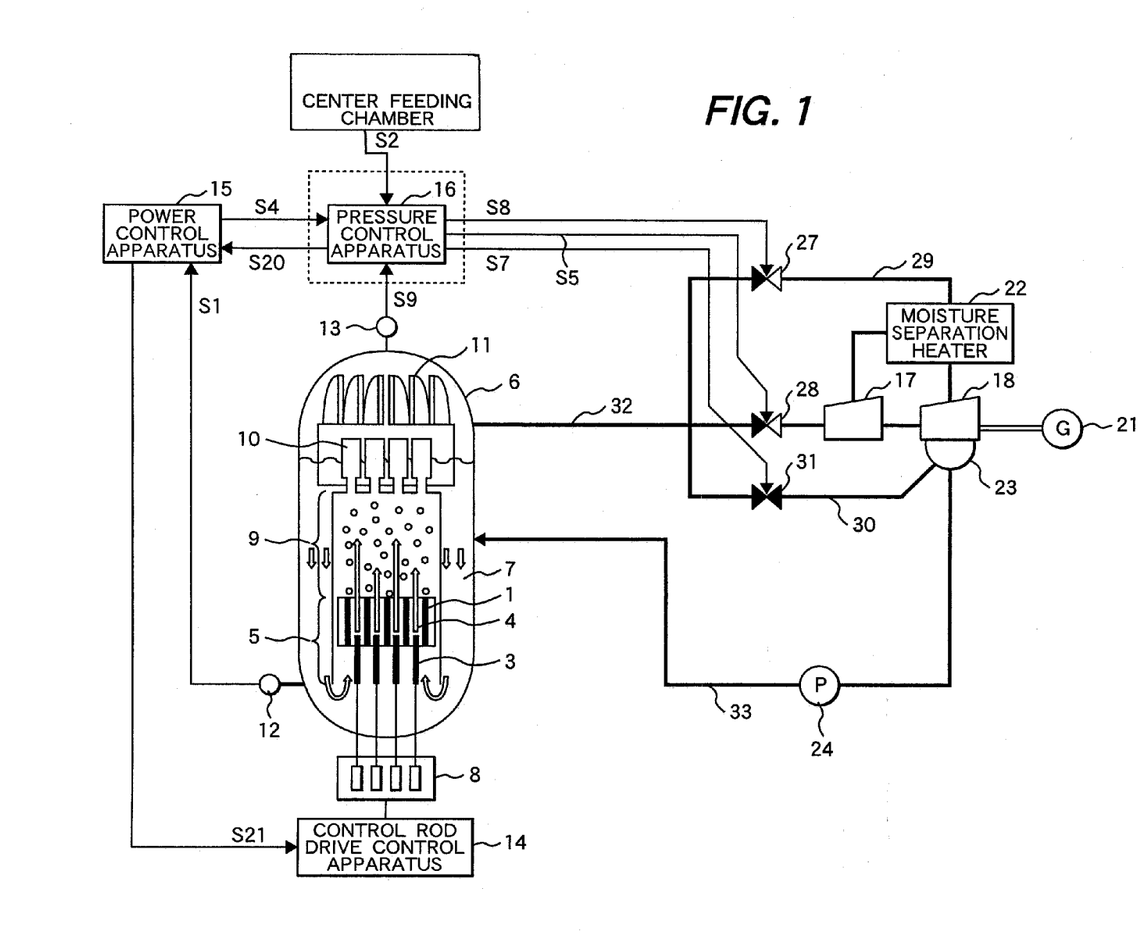
FIG. 1 is a pattern diagram showing the overall structure of an embodiment of the reactor generation system having a natural circulation reactor of the present invention.

FIG. 1 is a pattern diagram showing an embodiment of the generation system having the reactor power control apparatus of the natural circulation reactor of the present invention.

As shown in FIG. 1, the natural circulation reactor included in the generation system of the natural circulation reactor comprises a plurality of fuel assemblies 1 and a reactor pressure vessel 6 which encloses a core 4 wherein a control rod 3 is inserted into a space between the fuel assemblies 1 to control the reactivity of the core 4.

Control rod drive apparatuses 8 are provided at the lower part of the reactor pressure vessel 6. The control rod drive apparatuses 8 drive the control rod 3 in the vertical direction inside the core 4 such that it can be inserted and withdrawn. The main steam pipe 32 and the feed water pipe 33 are connected to the reactor pressure vessel 6.

A cylindrical core shroud 5 is disposed so as to enclose the core 4. An ascending path in which the coolant ascends in the direction of the arrow in the drawing is formed in the core shroud 5. A downcomer 7 which is descending paths is formed between the core shroud 5 and the reactor pressure vessel 6. The coolant descends in the downcomer 7. A cylindrical chimney 9 is disposed at the upper section of the core shroud 5 and a steam separator 10 and a steam dryer 11 are provided at the upper side of the chimney 9.

The coolant undergoes natural circulation force due to the difference in density between the coolant that is the two phase gas-liquid, boiled in the core 4 and ascending in the chimney 9 and the coolant that is liquid phase, descending in the downcomer 7. In the reactor pressure vessel 6, a circulation path that the coolant descends down the downcomer 7 and then ascends in the core 4 and the chimney 9, and the coolant separated the steam by the steam separator 10 descends in the downcomer 7 another time, is formed.

At the steam drier 11, the tiny water droplets are removed from the steam that is separated at the steam-water separator 10, and then the steam is supplied to the high-pressure turbine 17 and then introduced to the low-pressure turbine 18 via the main steam pipe 32. The steam introduced to the low-pressure turbine 18 is converted to rotational energy for the turbine. A generator 21 connected to the low-pressure turbine 18 is rotated and the power is generated.

In addition a moisture separation heater 22 for heating the steam whose temperature was reduced in the high-pressure turbine 17 and restoring energy efficiency is provided between the high-pressure turbine 17 and the low-pressure turbine 18.

The steam that rotated the low-pressure turbine 18 is condensed at the condenser 23 which has a cooling source and the steam becomes condensed water (cooling water). The condensed water is passed through the feed water pipe 33 having the feed water pump 24 and returned to the inside of the reactor pressure vessel 6.

It is to be noted that the main steam pipe 32 has a main steam control valve 28 for adjusting the flow rate of steam being supplying into the high-pressure turbine 17. The inlet port steam pipe 29 and the turbine bypass pipe 30 are also connected to the main steam pipe 32. The inlet port steam pipe 29 has an inlet port steam control valve 27 which adjusts the amount of steam flowing into the moisture separation heater 22. The turbine bypass pipe 30 has a turbine bypass valve 31 which adjusts the flow rate of steam being introduced to the condenser 23.

The reactor power control apparatus of the natural-circulation reactor provides with a power control apparatus 15 which is the power control section for controlling the reactor power to a predetermined reactor power and a pressure control apparatus 16 which is the power control section for controlling the reactor pressure to a predetermined pressure.

The load following demand signal S2 from the center feeding chamber (not shown), the power adjustment demand signal S4 from the power control apparatus 15 and the reactor pressure signal S9 from the reactor pressure detector 13 provided in the reactor pressure vessel 6 are input to the pressure control apparatus 16. It is to be noted that any one of the load following demand signal S2 and the power adjustment demand signal S4 may be input.

The load following demand signal S2 herein may, for example, be a signal having comparatively narrow range and short period which is output from the center feeding chamber for stabilizing the overall generation power of the generation system, and refers to a sign wave type signal which changes in units of seconds as is the case for speed governing.

Inlet port steam control valve opening command signal S8 for the inlet port steam control valve 27, main steam control valve opening command signal S5 for the main steam control valve 28 and turbine bypass valve opening command signal S7 for the turbine bypass valve 31 are output from the pressure control apparatus 16. Further, the reactor power equivalent signal S20 to be input to the power control apparatus 15 is output from the pressure control apparatus 16.

The reactor power signal S1 from the reactor power detector 12 provided in the reactor pressure vessel 6 and the abovementioned reactor power equivalent signal S20 are input into the power control apparatus 15.

The abovementioned power adjustment demand signal S4 and the control rod drive command signal S21 for the control rod drive control apparatus 14 are output from the power control apparatus 15.

The power control apparatus 15 into which the reactor power equivalent signal S20 has been input, outputs the control rod drive command signal S21. The control rod drive control apparatus 14 is driven by the control rod drive command signal S21. In the case where the reactor power equivalent signal S20 is the command signal that increases the reactor power, the control rod 3 is withdrawn from the core 4 by the control rod drive apparatus 8. In the case where the reactor power equivalent signal S20 is the command signal that decreases the reactor power, the control rod 3 is inserted into the core 4.

Figure 2:
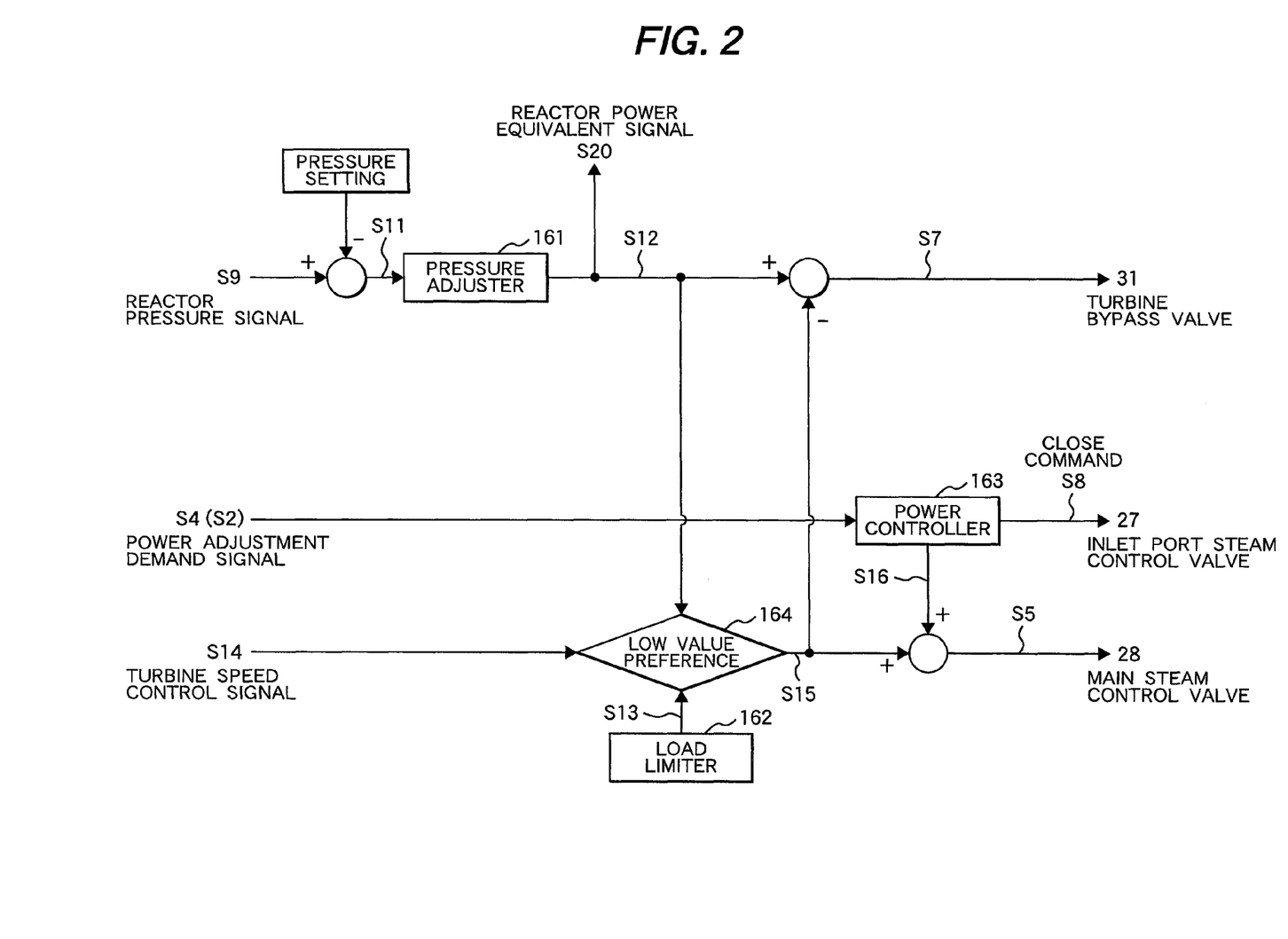
FIG. 2 is a block diagram showing the control system of the pressure control apparatus in the generation system of the natural circulation reactor shown in FIG. 1.

FIG. 2 shows control system inside the pressure control apparatus 16 in the generation system of the natural circulation reactor shown in FIG. 1.

As shown in FIG. 2, in the pressure control apparatus 16, the power adjustment demand signal S4 which is the error signal in which the current power value is subtracted from the target power value, is output from the power control apparatus 15 and input into the power controller 163 which is provided in the pressure control apparatus 16. It is to be noted that the power adjustment demand signal S4 may be directly input into the power controller 163 without going via the power control apparatus 15.

Preset pressure setting value for keeping the reactor pressure fixed is subtracted from reactor pressure signal S9 output from the reactor pressure detector 13. Pressure error signal S11 that is the error between the preset pressure setting value and the reactor pressure signal S9 is input to the pressure adjuster 161 provided in the pressure control apparatus 16.

The pressure adjuster 161 adjusts the input pressure error signal S11 and outputs the pressure signal S12. The low value preferential signal S15 output from the low value preferential circuit 164 as described hereinafter is subtracted from the pressure signal 12. As a result, turbine bypass valve opening command signal S7 that is error signal is generated. The turbine bypass valve 31 is opened based on the difference amount of the turbine bypass valve opening command signal S7.

The pressure signal S12 output from the pressure adjuster 161, the turbine speed control signal S14 that is output from the turbine speed controller and the load limit signal S13 output from the load limiter 162 that is provided in the pressure control apparatus 16 are input into low value preferential circuit 164. The low value preferential circuit 164 selects one low value signal of the pressure signal S12, the load limit signal S13 and the turbine speed control signal S14, and outputs the low value preferential signal S15.

In the case where the reactor power decreases, the power controller 163 performs proportional-integral control to the input power adjustment demand signal S4, and outputs inlet port steam control valve opening command signal S8 which is the close command. The inlet port steam control valve 27 is closed based on the inlet port steam control valve opening command signal S8 and as a result, reactor power increases. It is to be noted that the signal being input into the power controller 163 may also be the load following demand signal S2 output from the center feeding chamber.

In the case where the load following demand signal S2 is the generator power increase request signal, as described above, the inlet port steam control valve 27 is closed based on the inlet port steam control valve opening command signal S8 and reactor power increases.

Meanwhile, the power control signal S16 output from the power controller 163 is added to the low-value preferential signal S15, and the main steam control valve opening command signal S5 is generated. The main steam control valve 28 is opened based on the addition amount of the main steam control valve opening command signal S5.

As described above, in the reactor power control apparatus of this embodiment, when the inlet port steam control valve opening command signal S8 is output as a close command, the degree of opening of the inlet port steam control valve 27 is controlled to be 0%, in other words, the inlet port steam control valve is closed. Thus, the steam that is to be supplied to the inlet port steam pipe 29 is blocked by the inlet port steam control valve 27 and introduced into the main steam control valve 28. As a result, the flow rate of steam being supplying to the high-pressure turbine 17 increases and power of the generator 21, that is, the reactor power can be increased. In this manner, according to the reactor power control apparatus of this embodiment, because power from the generator 21 can be increased in a short period of time without operating the control rod 3, following of load variation can be increased.

In addition, according to the reactor power control apparatus of the natural circulation reactor of this embodiment, even if there is variation in reactor power, the main steam control valve 28 through which an abundance of steam pass is never closed. Thus, operation of the reactor can continue without causing any variation in reactor power.

According to the power control method for the natural circulation reactor of this embodiment, stable reactor operation can be performed without great variation in reactor power, because firstly, continuous valve open and close control of a series of valves described above is performed by the pressure control apparatus 16 in a short period, and subsequently long control operations such as that required for control rod 3 operation is performed by the power control apparatus 15 as described above.

Figure 7:
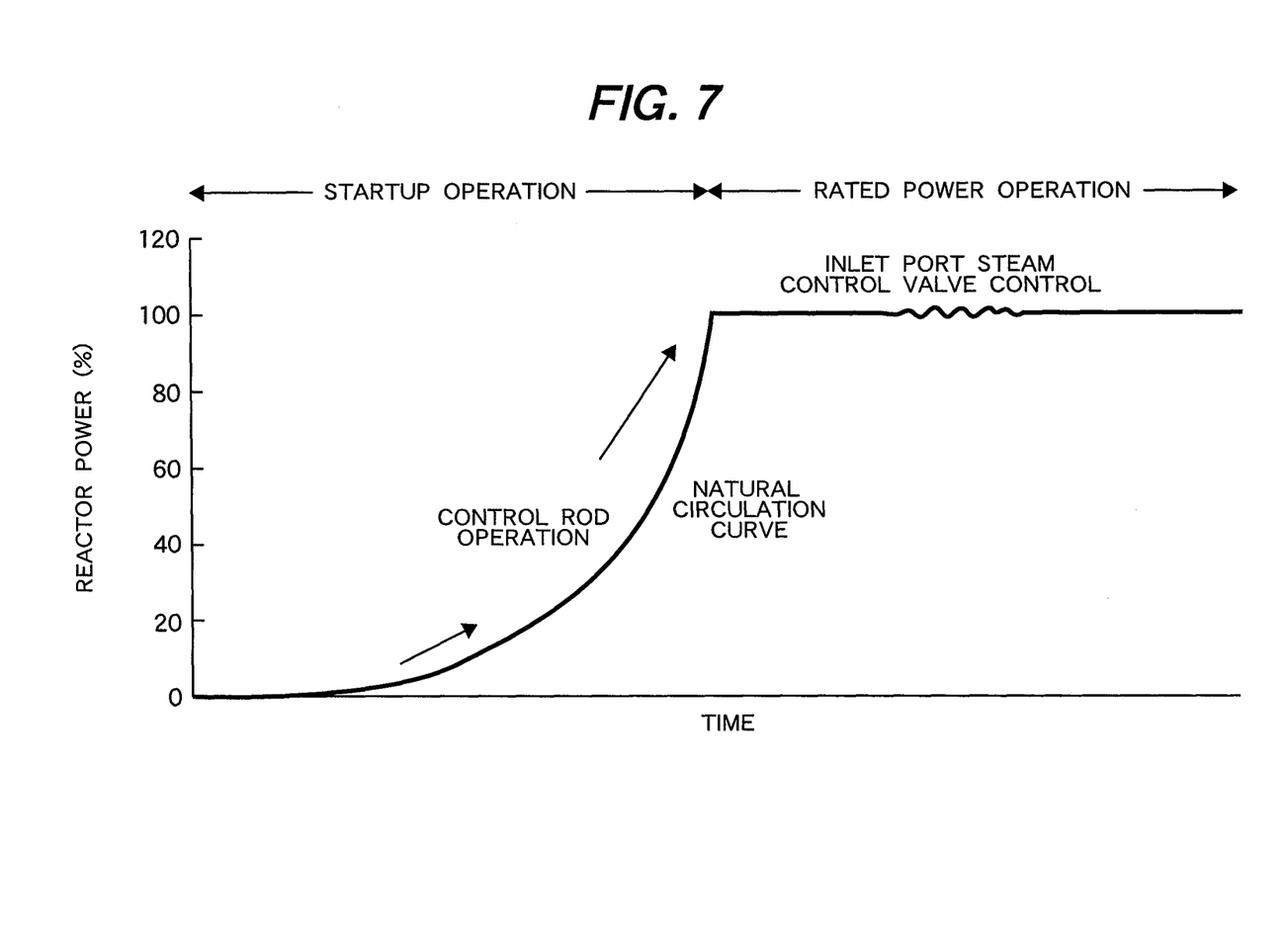
FIG. 7 is explanatory drawing showing the time series changes in the reactor operation state.

In addition, as shown in FIG. 7, the control being performed in the reactor power control apparatus of this embodiment is performed for load variation which occurs mainly during rated power operation and not during start-up operation. That is to say, in the reactor power control apparatus of this embodiment, control carried out in a comparatively short period of time is performed by the pressure control apparatus 16, and control which requires a comparatively long period of time is performed by the power control apparatus 15.

It is to be noted that in this embodiment, the degree of valve opening of the inlet port steam control valve 27 is either 0% or 100% which is the fully open operation state, but a structure having the half open configuration such as that in which the degree of valve opening of the inlet port steam control valve 27 is about 50% may be employed. Because the degree of the opening of the inlet port steam control valve 27 is in the half open state in this manner, the degree of the valve opening has the margin. Thus, the inlet port steam control valve can be operated when the reactor power increases, as well as when the reactor power decreases.

Figure 3:
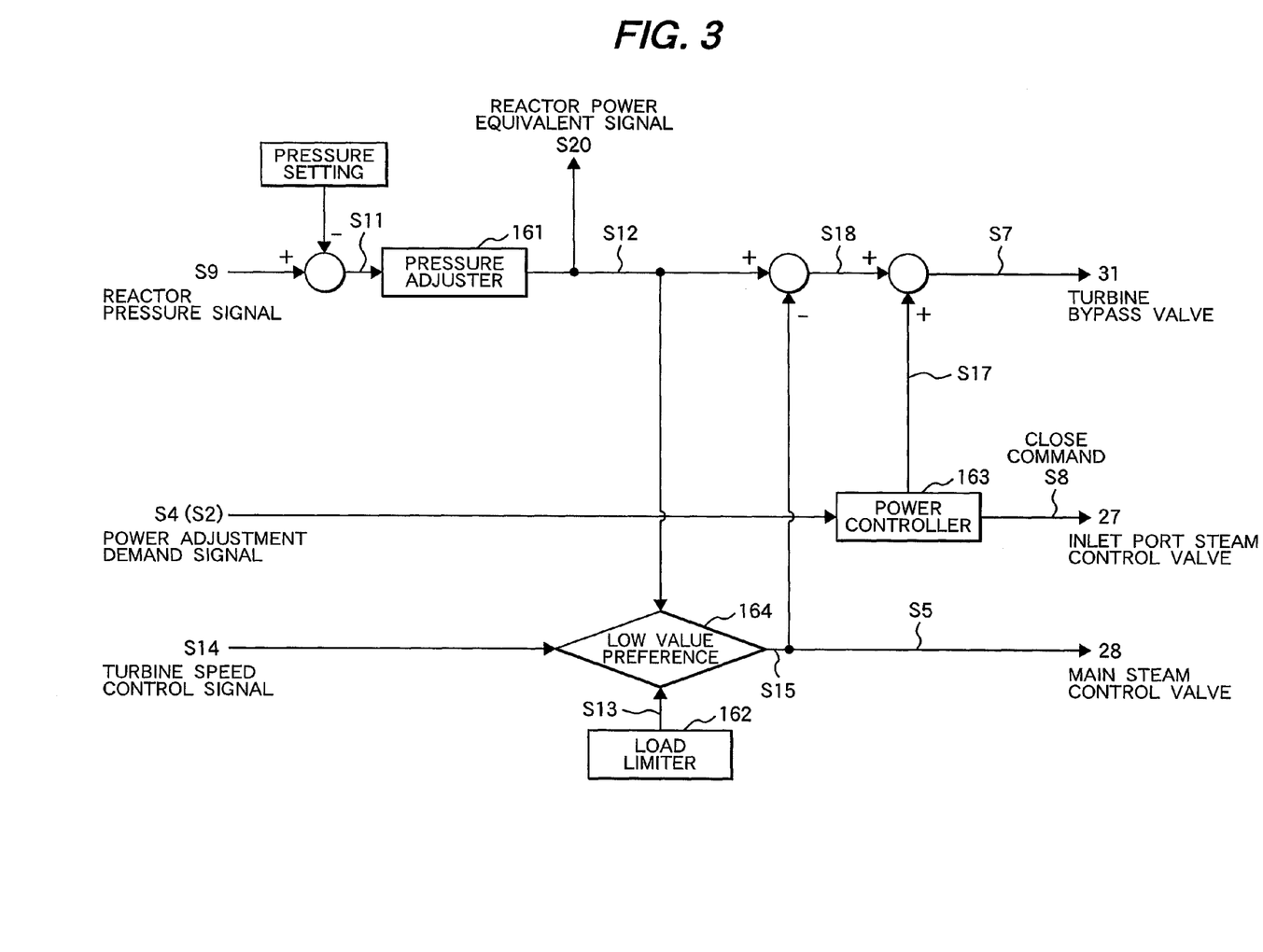
FIG. 3 is a block diagram showing a control system of another embodiment of the pressure control apparatus in the reactor generation system shown in FIG. 1.

FIG. 3 shows a control system of another embodiment of the pressure control apparatus 16 in the reactor generation system shown in FIG. 1.

The structure of this embodiment differing from the control system shown in FIG. 2 will be described hereinafter. The power controller 163 outputs power control signal S17 obtained by subjecting to proportional-integral control the power adjustment demand signal S4 for example. This power control signal S17 is added to the differential signal S18 obtained by subtracting the low value preferential signal S15 from the power signal S12. The turbine bypass valve opening command signal S7 is obtained by adding the power control signal S17 to the differential signal S18. The degree of the opening of the turbine bypass valve 31 is controlled based on the addition amount of this turbine bypass valve opening command signal S7.

According to the reactor power control apparatus of this embodiment, because the steam of the amount which is proportional to the degree of the opening of the turbine bypass valve 31 is supplied to the condenser 23 and the steam becomes condensed water, power of the generator 21, in other words, the reactor power can be maintained at a constant value. Thus, the reactor power control apparatus of this embodiment is effective as a control system in the case where the reactor power varies.

It is to be noted that two power control signals S16 and S17 may be output from the power controller 163, and open and close control of the main steam control valve 28 and open and close control of the turbine bypass valve 31 may be performed together. As a result, both the main steam control valve 28 and the turbine bypass valve 31 are used together and reactor power can be adjusted.

Figure 4:
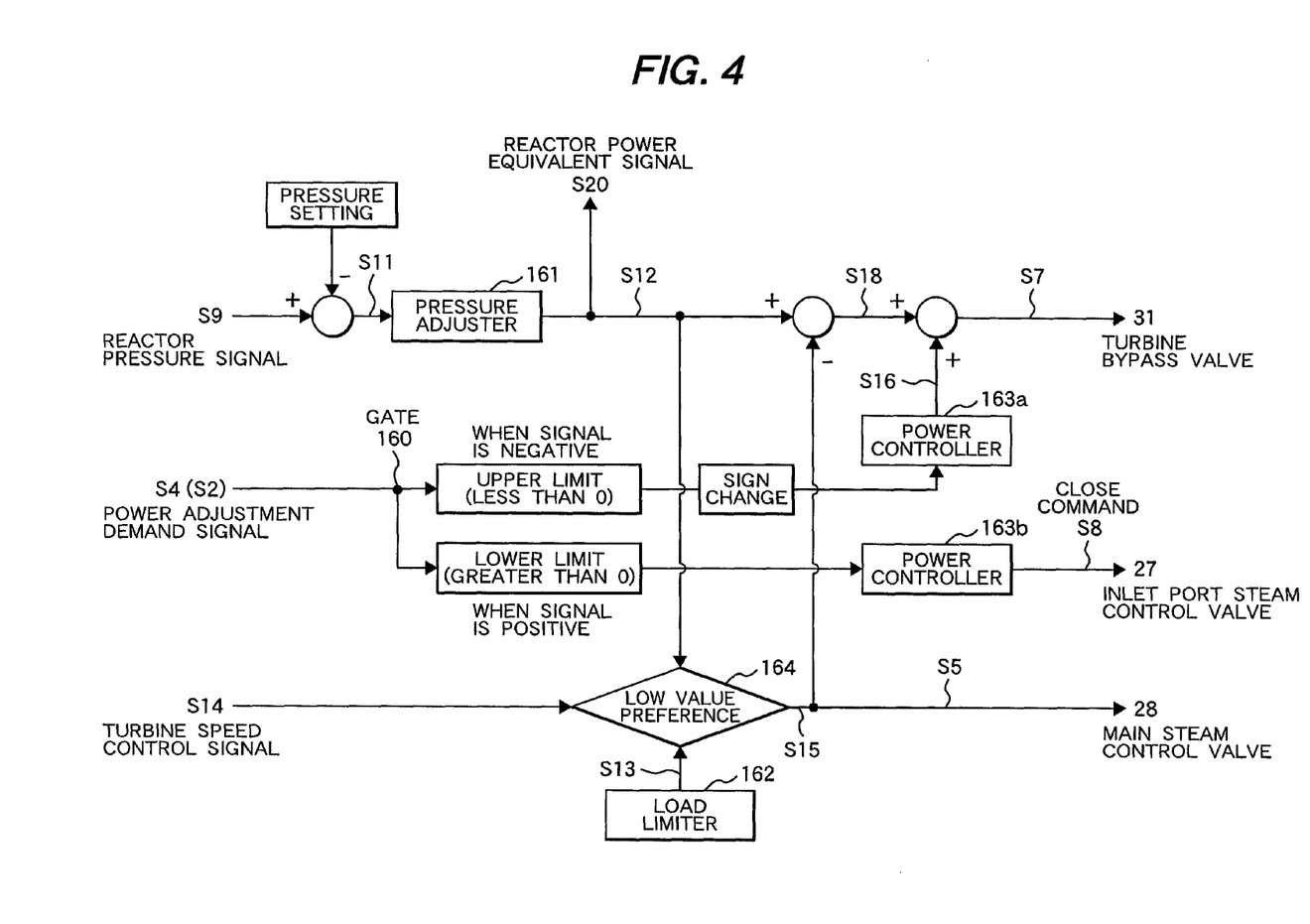
FIG. 4 is a block diagram showing a control system of another embodiment of the pressure control apparatus in the reactor generation system shown in FIG. 1.

FIG. 4 shows a control system of another embodiment in the pressure control apparatus 16 in the reactor generation system shown in FIG. 1.

In the control system of this embodiment, the structure differing from the control system shown in FIG. 2 will be described hereinafter. This pressure control apparatus provides with an input gate portion 160 that inputs the output power adjustment demand signal S4. In the case where the reactor power state is greater than the target value, the value of the power adjustment demand signal S4 is defined as negative, and in the case where the reactor power state is smaller than the target value, the value of the power adjustment demand signal S4 is defined as positive.

That is to say, in the case where the input power adjustment demand signal S4 is negative, the reactor power is controlled so as to decrease. In the case where the input power adjustment demand signal S4 is positive, the reactor power is controlled so as to increase.

Figure 5:
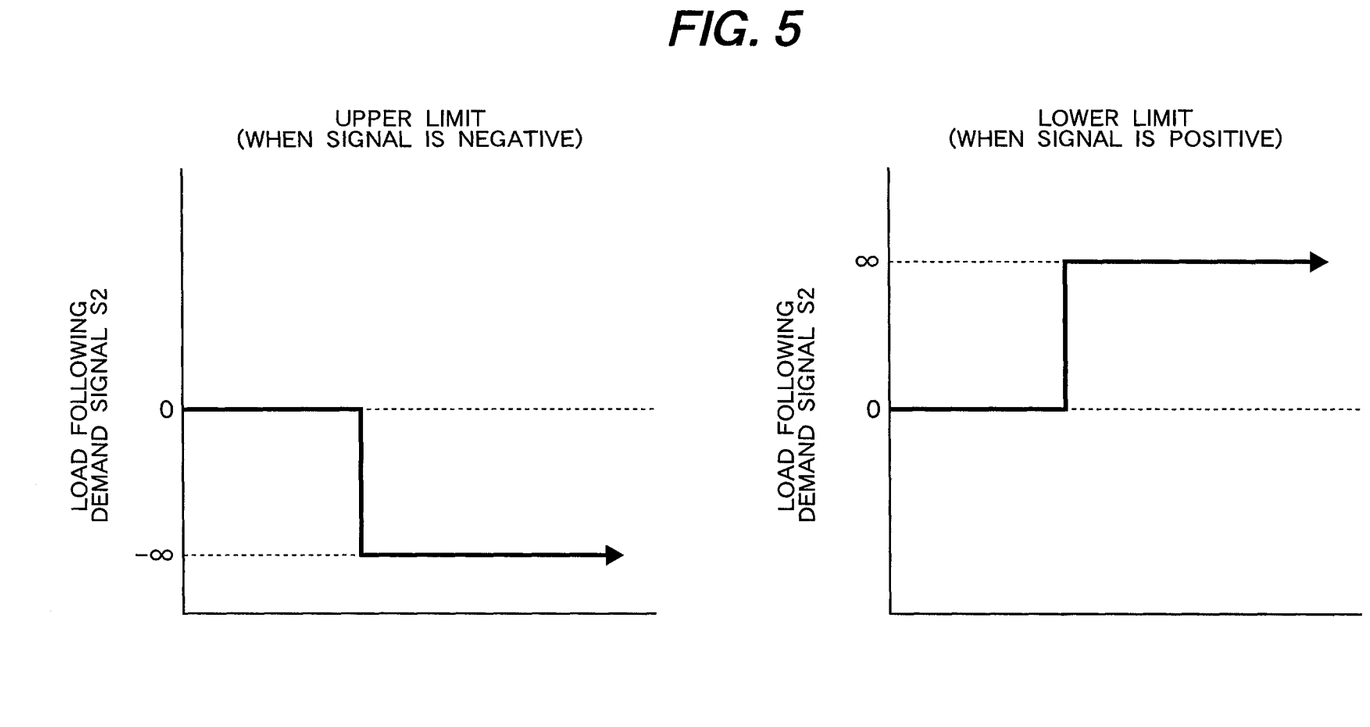
FIG. 5 is explanatory drawing showing the upper limit and the lower limit of the input load following demand signal.

As shown in FIG. 5, in this embodiment, in the case where the threshold value is set at 0 and the power adjustment demand signal S4 is a negative signal, an upper limit that is less than 0 is set. In the case where the power adjustment demand signal S4 is a positive signal, a lower limit that is greater than 0 is set. As a result, the turbine bypass valve 31 and the inlet port steam control valve 27 are controlled separately.

In the case where the input power adjustment demand signal S4 is negative, the power adjustment demand signal S4 passed through the input gate portion 160 is changed the sign and is subsequently input into the power controller 163a provided in the pressure control apparatus 16. The power controller 163a performs the proportional-integral control to the input power adjustment demand signal S4 for example, and outputs power control signal S16. The power control signal S16 is added to the differential signal S18 obtained by subtracting the low value preferential signal S15 from the power signal S12 to become the turbine bypass valve opening command signal S7. As a result, the opening of the turbine bypass valve 31 is controlled by the addition amount of this turbine bypass valve opening command signal S7.

Thus, according to reactor power control apparatus of this embodiment, in the case where the power adjustment demand signal S4 is negative, because the steam of the amount which is proportional to the degree of the opening of the turbine bypass valve 31 is supplied to the steam condenser 23 and the steam becomes condensed water, the power of the generator 21, in other words, the reactor power that has been increased for some reason is controlled so as to decrease (or return to the target value).

Meanwhile, in the case where the input power adjustment demand signal S4 is positive, the power adjustment demand signal S4 is passed through the input gate portion 160 and then input into the power controller 163b provided in the pressure control apparatus 16. The power controller 163b performs the proportional-integral control for the power adjustment demand signal S4 for example, and outputs the inlet port steam control valve opening command signal S8 which is the close command. The inlet port steam control valve 27 is controlled so as to close by this inlet port steam control valve opening command signal S8.

Thus, according to the reactor power control apparatus of this embodiment, in the case where the power adjustment demand signal S4 is positive, the degree of the opening of the inlet port steam control valve 27 is controlled to be 0%, that is, such that the inlet port steam control valve 27 is closed. Accordingly, the steam flow being introduced to the inlet port steam pipe 29 is stopped by the inlet port steam control valve 27. As a result, the reactor power that has decreased for some reason can be increased (returned to the target value). In this manner, according to the reactor power control apparatus of this embodiment, because the reactor power can be adjusted (restored to the target value) in a short period of time without operating the control rod, continuous operation of the reactor with stable reactor power becomes possible.

It is to be noted that the signal being input can be the load following demand signal S2 that was output from the power control apparatus 15 rather than the power adjustment demand signal S4. It is to be noted that in this case, it is preferable that the power control signal S16 from the power controller 163a corrects the main steam control valve opening command signal S5 and the degree of the opening of the main steam control valve 28 is adjusted by the corrected main steam control valve opening command signal S5.

The following is a description of the state of the natural circulation reactor in the case where the reactor power control apparatus of this invention is used.

Figure 6:
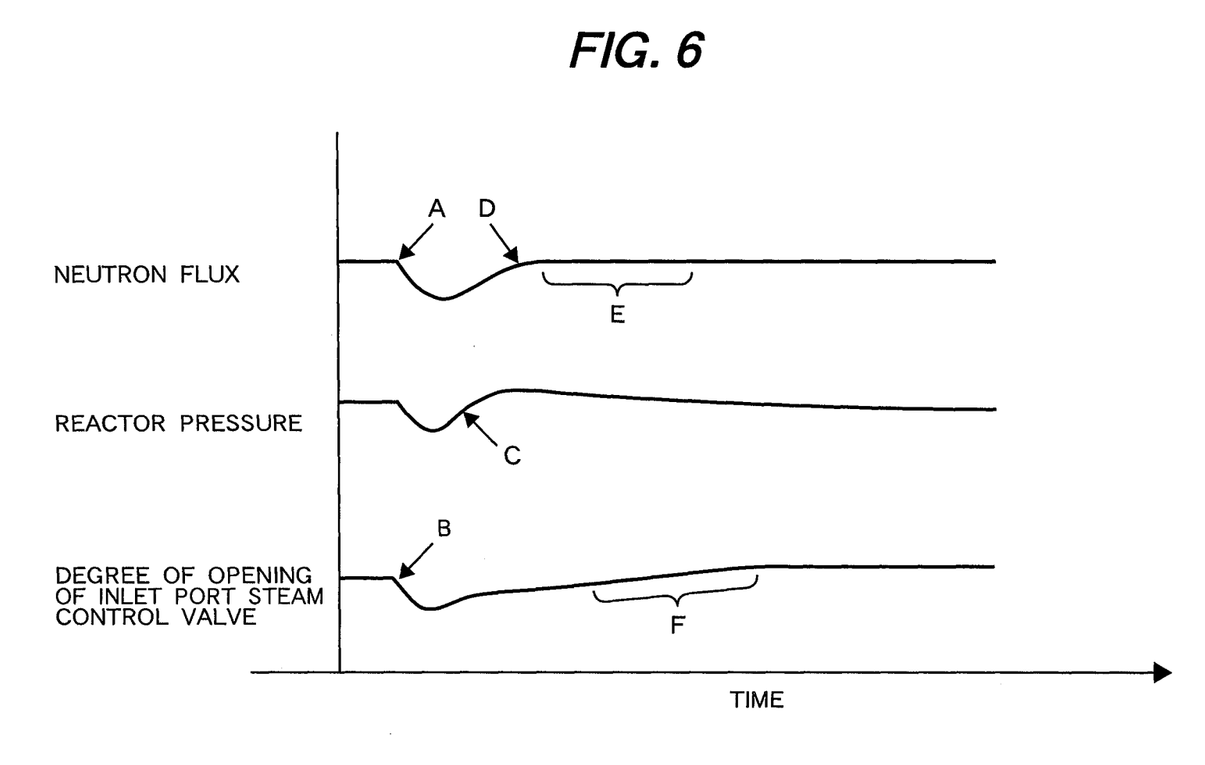
FIG. 6 is explanatory drawing showing the relative change in the main parameters for the reactor generation system in which the power control apparatus of the natural circulation reactor of this invention is used.

FIG. 6 shows the relative changes of the main parameters for the state of the natural circulation reactor in which the reactor power control apparatus is used.

As shown in FIG. 6, reactor neutron flux, reactor pressure, and the degree of the opening of the inlet port main steam control valve (MSH-CV) are selected as the main parameters. The relative changes in the main parameter are described in a time series.

First, for example reduction of the neutron flux in the reactor pressure vessel 6 begins and reduction of the reactor power begins due to variation in the feed water temperature by a change in the operation state of the feed water pump changing for some reason (A). When this occurs, the degree of the opening of the inlet port steam control valve 27 is controlled so as to be smaller by the pressure control apparatus 16 which receives the power adjustment demand signal S4 (B). Next, the internal pressure of the reactor pressure vessel 6 starts to increase when the inlet port steam control valve 27 closes (C). In addition, when the internal pressure of the reactor pressure vessel increases, the void that is generated in the reactor is collapsed, and thus neutron flux increases and reactor power is restored (D).

Furthermore, because the control rod 3 is withdrawn from the core 4 by the power control apparatus 15 that input the reactor power equivalent signal S20, the neutron flux in the reactor is gently increased and the reactor power also gently increase so as to correspond with the neutron flux increase (E) In addition, as the reactor power is restored, the degree of the opening in the inlet port steam control valve 27 is also restored to its original state (F).

It is to be noted that the reactor power control apparatus of the present invention is not to be limited by the embodiments described above and as a matter of course, various modifications and changes can be made to the structure of the present invention in terms of use of other materials and configuration, without departing from the scope of the present invention.

What is claimed is:

1. A generation system comprising:
    a natural circulation reactor adapted to generate steam only by naturally circulating coolant internally within said natural circulation reactor without a pump being disposed within said natural circulation reactor;
    a high-pressure turbine connected to said natural circulation reactor by a main steam pipe configured to at least introduce steam generated in said natural circulation reactor to said high-pressure turbine, said main steam pipe having one end connected to said natural circulation reactor and another end connected to said high-pressure turbine;
    a low-pressure turbine configured to receive steam exhausted from said high-pressure turbine;
    a moisture separation heater installed between said high-pressure turbine and said low-pressure turbine and configured to at least receive steam exhausted from said high-pressure turbine;
    a first steam control valve installed in said main steam pipe at a position between the one end of the main steam pipe connected to said natural circulation reactor and the another end of said main steam pipe connected to said high-pressure turbine;
    an inlet pipe having a second steam control valve installed in said inlet pipe, said inlet pipe having one end of said inlet pipe connected to said main steam pipe at a position between said natural circulation reactor and said first steam control valve installed in said main steam pipe, and said inlet pipe having another end of said inlet pipe connected to said moisture separation heater, said second steam control value being installed at a position between the one end of said inlet pipe connected to said main steam pipe and the another end of said inlet pipe connected to said moisture separation heater;

a control rod drive apparatus connected with a control rod configured to be inserted and withdrawn with respect to a core of said natural circulation reactor;

a power control apparatus adapted to output a power adjustment demand signal and a control rod drive command signal based on a reactor power detected by a reactor power detector configured to detect reactor power;

a control rod drive control apparatus adapted to control said control rod drive apparatus based on said control rod drive command signal; and a pressure control apparatus adapted to control a pressure of said natural circulation reactor;

wherein said pressure control apparatus is adapted to control a degree of opening of said second steam control valve installed in said inlet pipe based on said power adjustment demand signal, and is adapted to control a degree of opening of said first steam control valve installed in said main steam pipe jointly in accordance with control of the degree of the opening of said second steam control valve installed in said inlet pipe;

whereby the steam is generated in said natural circulation reactor only by the natural circulation of the coolant internally within said natural circulation reactor without a pump being disposed within said natural circulation reactor.

2. The generation system according to claim 1, wherein any one of said pressure control apparatus and said power control apparatus is adapted to input a load following demand signal from a center feeding chamber.

3. The generation system according to claim 2, wherein said first steam control valve installed in said main steam pipe is installed in said main steam pipe upstream of said high-pressure turbine;

wherein said inlet pipe has the one end connected to said main steam pipe upstream of said first steam control valve installed in said main steam pipe; and wherein said pressure control apparatus controls a degree of opening of said steam control valve installed in said main steam pipe jointly in accordance with control of the degree of the opening of said second steam control valve installed in said inlet pipe when said load following demand signal has a narrow range and a short period.

4. The generation system according to claim 1, wherein a turbine bypass pipe is connected to said main steam pipe upstream of said high-pressure turbine and to a condenser configured to receive steam exhausted from said low-pressure turbine;

wherein a turbine bypass valve is installed in said turbine bypass pipe; and wherein said pressure control apparatus is adapted to control a degree of opening of said turbine bypass valve jointly in accordance with control of the degree of the opening of said second steam control valve installed in said inlet pipe.

5. The generation system according to claim 4, wherein said pressure control apparatus has a gate portion, and controls said turbine bypass control valve to open when said power adjustment demand signal is greater than a preset threshold, and controls said second steam control valve installed in said inlet pipe to close when said power adjustment demand signal is smaller than said preset threshold.

6. The generation system according to claim 1, wherein a turbine bypass pipe is connected to said main steam pipe upstream of said first steam control valve installed in said main steam pipe and to a condenser adapted to receive steam exhausted from said low-pressure turbine;

wherein a turbine bypass valve is installed in said turbine bypass pipe; and wherein said pressure control apparatus is adapted to control a degree of opening of first said steam control valve installed in said main steam pipe and a degree of opening of said turbine bypass valve jointly in accordance with control of the degree of the opening of said second steam control valve installed in said inlet pipe.

7. The generation system according to claim 6, wherein said pressure control apparatus has a gate portion, and controls said turbine bypass control valve to open when said load following demand signal is greater than a preset threshold, and controls said second steam control valve installed in said inlet pipe to close when said load following demand signal is smaller than the preset threshold.

8. The generation system according to claim 1, wherein when a variation in the reactor power of said natural circulation reactor is transient, said pressure control apparatus is adapted to control the degree of the opening of said second steam control valve installed in said inlet pipe based on said power adjustment demand signal.

9. The generation system according to claim 1, wherein said power control apparatus inputs a reactor power equivalent signal from said pressure control apparatus, and controls a control rod drive apparatus that is connected with a control rod based on said reactor power equivalent signal.

10. The generation system according to claim 1, wherein said pressure control apparatus is adapted to control the degree of opening of said second steam control valve installed in said inlet pipe in inverse relation to the degree of opening of said first steam control valve installed in said main steam pipe so as to provide the joint control and said first and second steam control valves.

11. The generation system according to claim 10, wherein said pressure control apparatus is adapted to control the degree of opening of said second steam control valve installed in said inlet pipe so as to decrease the degree of opening of said second steam control valve installed in said inlet pipe while jointly controlling the degree of opening of said first steam control valve installed in said main steam pipe so as to increase the degree of opening of said first steam control valve installed in said main steam pipe so that the amount of steam supplied through said inlet pipe connected to said moisture separation heater is decreased and an amount of steam introduced into said high-pressure turbine through said steam control valve installed in said main steam pipe is increased.

12. The generation system according to claim 1, wherein said inlet pipe includes a portion providing a direct connection between said second steam control valve and said moisture separation heater.

13. A method for controlling reactor power of a natural circulation reactor adapted to generate steam only by naturally circulating coolant internally within said natural circulation reactor without a pump being disposed within said natural circulation reactor, and having a high-pressure turbine connected to said natural circulation reactor by a main steam pipe which introduces steam generated in said natural circulation reactor at least to said high-pressure turbine, said main steam pipe having one end connected to said natural circulation reactor and another end connected to said high-pressure turbine, a low-pressure turbine to which steam exhausted from said high-pressure turbine is supplied, a moisture separation heater installed between said high-pressure turbine and said low-pressure turbine for at least receiving steam exhausted from said high-pressure turbine, a first steam control valve installed in said main steam pipe upstream of said high-pressure turbine at a position between the one end of the main steam pipe connected to said natural circulation reactor and the another end of said main steam pipe connected to said high-pressure turbine, a reactor power control apparatus which controls reactor power of said natural circulation reactor, and a pressure control apparatus which controls reactor pressure in said natural circulation reactor, said moisture separation heater being connected to said main steam pipe upstream of said first steam control valve installed in said main steam pipe by an inlet steam pipe having a second steam control valve installed in said inlet steam pipe, said inlet steam pipe having one end connected to said main steam pipe and another end connected to said moisture separation heater, said second steam control valve being installed in said inlet steam pipe at a position between the one end of said inlet steam pipe connected to said main pipe and the another end of said inlet steam pipe connected to said moisture separation heater, the method comprising the steps of:

controlling a degree of opening of said first steam control valve installed in said main steam pipe jointly in accordance with control of a degree of opening of said second steam control valve installed in said inlet steam pipe based on one of a load following demand signal and a power adjustment demand signal by said pressure control apparatus; and controlling a control rod drive apparatus, to which a control rod is connected by said power control apparatus in order to operate said control rod when a reactor power equivalent signal is input into said power control apparatus;

whereby the steam is generated in said natural circulation reactor only by the natural circulation of the coolant internally within said natural circulation reactor without a pump being disposed within said natural circulation reactor.

14. The method according to claim 13, wherein said pressure control apparatus is adapted to control the degree of opening of said second steam control valve installed in said inlet steam pipe in inverse relation to the degree of opening of said first steam control valve installed in said main steam pipe so as to provide the joint control of said first and second steam control valves.

15. The method according to claim 14, wherein said pressure control apparatus is adapted to control the degree of opening of said second steam control valve installed in said inlet steam pipe so as to decrease the degree of opening of said second steam control valve while jointly controlling the degree of opening of said first steam control valve installed in said main steam pipe so as to increase the degree of opening of said first steam control valve so that the amount of steam supplied through said inlet steam pipe connected to said moisture separation heater is decreased and an amount of steam introduced into said high-pressure turbine through said first steam control valve installed in said main steam pipe is increased.

16. The method according to claim 13, wherein said inlet steam pipe includes a portion providing a direct connection between said second steam control valve and said moisture separation heater.

17. A method for controlling reactor power of a natural circulation reactor adapted to generate steam only by naturally circulating coolant internally within said natural circulation reactor without a pump being disposed within said natural circulation reactor, and having a high-pressure turbine connected to said natural circulation reactor by a main steam pipe adapted to at least introduce steam generated in said natural circulation reactor to said high-pressure turbine, a low-pressure turbine adapted to receive steam exhausted from said high-pressure turbine, a moisture separation heater installed between said high-pressure turbine and said low-pressure turbine adapted to at least receive steam exhausted from said high-pressure turbine, said main steam pipe having one end connected to said natural circulation reactor and another end connected to said high-pressure turbine, a first steam control valve being installed in said main steam pipe between the one end of said main steam pipe connected to said natural circulation reactor and the another end of said main steam pipe connected to said high-pressure turbine, an inlet pipe having a second steam control valve installed in said inlet pipe, said inlet pipe having one end connected to said main steam pipe at a position between the one end of said main steam pipe connected to said natural circulation reactor and said first steam control valve installed in said main steam pipe, said inlet pipe having another end connected to said moisture separation heater, said second steam control valve being installed in said inlet pipe at a position between the one end of said inlet pipe connected to said main steam pipe and the another end of said inlet pipe connected to said moisture separation heater, a control rod drive apparatus connected with a control rod adapted to be inserted and withdrawn with respect to a core of said natural circulation reactor, a power control apparatus adapted to output a power adjustment demand signal and a control rod drive command signal based on a reactor power detected by a reactor power detector adapted to detect reactor power, a control rod drive control apparatus adapted to control said control rod drive apparatus based on said control rod drive command signal, and a pressure control apparatus configured to control a pressure of said natural circulation reactor, the method comprising the steps of:

controlling with said pressure control apparatus a degree of opening of said second steam control valve installed in said inlet pipe based on said power adjustment demand signal, and controlling a degree of opening of said first steam control valve installed in said main steam pipe jointly in accordance with control of the degree of the opening of said second steam control valve installed in said inlet pipe;

whereby the steam is generated in said natural circulation reactor only by the natural circulation of the coolant internally within said natural circulation reactor without a pump being disposed within said natural circulation reactor.

18. The method according to claim 17, wherein said pressure control apparatus is adapted to control the degree of opening of said second steam control valve installed in said inlet pipe in inverse relation to the degree of opening of said first steam control valve installed in said main steam pipe so as to provide the joint control of said first and second steam control valves, said inlet pipe including a portion providing a direct connection between said second steam control valve and said moisture separation heater.

19. The method according to claim 18, wherein said pressure control apparatus is adapted to control the degree of opening of said second steam control valve installed in said inlet pipe so as to decrease the degree of opening of said second steam control valve installed in said inlet pipe while jointly controlling the degree of opening of said first steam control valve installed in said main steam pipe so as to increase the degree of opening of said first steam control valve installed in said main steam pipe so that the amount of steam supplied through said inlet pipe connected to said moisture separation heater is decreased and an amount of steam introduced into said high-pressure turbine through said first steam control valve installed in said main steam pipe is increased.

20. The method according to claim 17, wherein said inlet pipe includes a portion providing a direct connection between said second steam control valve and said moisture separation heater.

* * * * *